(12) United States Patent
Watanabe et al.

(10) Patent No.: US 8,745,831 B2
(45) Date of Patent: Jun. 10, 2014

(54) PALLET CHANGER OF MACHINE TOOL

(75) Inventors: Michio Watanabe, Yamatokoriyama (JP); Yoshinori Sakashita, Kizugawa (JP); Yoshihiro Yamada, Yamatokoriyama (JP); Tomoyoshi Matsuyama, Iga (JP)

(73) Assignee: DMG Mori Seiki Co., Ltd., Yamatokoriyama (JP)

( * ) Notice: Subject to any disclaimer, the term of this patent is extended or adjusted under 35 U.S.C. 154(b) by 470 days.

(21) Appl. No.: 13/224,236

(22) Filed: Sep. 1, 2011

(65) Prior Publication Data
US 2012/0082532 A1   Apr. 5, 2012

(30) Foreign Application Priority Data

Sep. 6, 2010   (JP) ................. 2010-198574

(51) Int. Cl.
*B23Q 7/00*    (2006.01)
*B23Q 7/10*    (2006.01)
*B23Q 7/14*    (2006.01)
*B23Q 1/66*    (2006.01)
*B23Q 11/08*   (2006.01)

(52) U.S. Cl.
CPC .............. *B23Q 7/1431* (2013.01); *B23Q 7/001* (2013.01); *B23Q 1/66* (2013.01); *B23Q 2707/00* (2013.01); *B65G 2201/0267* (2013.01); *B23Q 11/08* (2013.01); *B23Q 11/0891* (2013.01); *B23Q 11/085* (2013.01); *Y10S 29/056* (2013.01)
USPC ...... 29/33 P; 198/346.1; 409/134; 29/DIG. 56

(58) Field of Classification Search
CPC ................................................ B23Q 2707/00
USPC ...... 29/563, 33 P, DIG. 56; 198/345.3, 346.1; 409/134
See application file for complete search history.

(56) References Cited

U.S. PATENT DOCUMENTS 4,133,423 A * 1/1979 Zankl ......................... 198/346.1
4,172,512 A * 10/1979 Clegg et al. ................ 198/346.1

(Continued)

FOREIGN PATENT DOCUMENTS

EP          2208570 A1      7/2010
JP       55-112753 A    *  8/1980

(Continued)

OTHER PUBLICATIONS

Supplementary European Search Report, directed to European Patent Application No. 11179792.4-2302/2425923, 5 pages, mailed on Mar. 7, 2012.

*Primary Examiner* — Erica E Cadugan
(74) *Attorney, Agent, or Firm* — Smith Patent Office

(57) ABSTRACT

A pallet changer includes: a machining-side linear guide rail 25 provided on a machining table 8 and extending in a Y-axis direction perpendicular to an X-axis direction (predetermined direction); preparation-side linear guide rails 26, 27 provided on workpiece preparation parts 9, 10 respectively, extending in the Y-axis direction, and coaxial with the machining-side linear guide rail 25; and linear guides 28 provided on respective pallets P1, P2 and slidably engageable with the machining-side and preparation-side linear guide rails 25 to 27, wherein, in changing the machining-side pallet P1 on the machining table 8 and the standby-side pallet P2 on the workpiece preparation part 10, the machining-side pallet P1 and the standby-side pallet P2 are moved in the Y-axis direction.

2 Claims, 11 Drawing Sheets

(56) References Cited

U.S. PATENT DOCUMENTS

| | | | |
|---|---|---|---|
| 4,679,286 A * | 7/1987 | Momoi et al. | 29/33 P |
| 4,715,490 A | 12/1987 | Date et al. | |
| 5,044,486 A * | 9/1991 | Kitamura | 198/346.1 |
| 5,054,175 A | 10/1991 | Date | |
| 5,172,464 A * | 12/1992 | Kitamura et al. | 29/563 |
| 5,187,846 A * | 2/1993 | Kitamura et al. | 29/33 P |
| 5,997,241 A | 12/1999 | Malcolm | |
| 7,357,769 B2 * | 4/2008 | Takayama et al. | 29/27 C |
| 8,056,200 B2 * | 11/2011 | Hesse et al. | 29/33 P |
| 2006/0118384 A1 * | 6/2006 | Funakoshi et al. | 198/345.3 |
| 2009/0074529 A1 * | 3/2009 | Okanda | 409/225 |

FOREIGN PATENT DOCUMENTS

| | | | |
|---|---|---|---|
| JP | 60-221241 A | | 11/1985 |
| JP | 62-292340 A | * | 12/1987 |
| JP | 3-26439 A | | 2/1991 |
| JP | 04-063658 A | * | 2/1992 |

* cited by examiner

PALLET CHANGER OF MACHINE TOOL

BACKGROUND OF THE INVENTION

1. Field of the Invention

The present invention relates to a pallet changer of a machine tool automatically changing a machining-side pallet mounted on a machining table and a standby-side pallet mounted on a workpiece preparation part.

2. Description of the Related Art

A typical structure of a conventional pallet changer of this type is to provide a plurality of pallet seatings, pallet position sensors, and positioning pins on a machining table side. In this conventional device, a pallet on a workpiece preparation part is moved up by a hydraulic cylinder to be mounted on the pallet seatings on the machining table side while the position is confirmed, and is locked by the positioning pins. In this case, chips are removed by an air blow in order to prevent the chips from being bitten in the pallet seatings.

SUMMARY OF THE INVENTION

If the conventional structure is adopted for changing a large pallet on which a long workpiece is mountable, many pallet seatings, positioning sensors, positioning pins are necessary. This is accompanied by problems that an ascending stroke of the pallet becomes large, the structures of wirings, pipes, and so on become complicated, and a necessary amount of the air blow further increases.

To solve the problems of the structure complication and the increase in the air blow amount, it is effective to change pallets by a linear guide method. For example, Japanese Patent Application Laid-open No. Hei 3-26439 discloses a structure in which a workpiece preparation part is arranged in series to a machining table in a movement direction of the machining table, machining-side and preparation-side linear guide rails extending in the movement direction are disposed on the machining table and the workpiece preparation part respectively, and the workpiece preparation part is moved between a pallet change position located collinearly with the machining table and a standby position deviated from the movement direction in a perpendicular direction.

The structure of the conventional pallet changer in which the machining table and the workpiece preparation part are arranged in series has a problem that, especially if the pallet is a large one on which a long workpiece is mountable, an installation space of the whole device increases in the movement direction.

Further, if, for example, a workpiece is machined while the machining-side and preparation-side linear guide rails closely face each other, there is a risk in the aforesaid pallet changer that scattered chips are likely to deposit on facing portions of the both linear guide rails, and the deposit is sometimes sandwiched between the linear guide rails and linear guides.

It is an object of the present invention to provide a pallet changer of a machine tool which makes it possible to solve the problem of the complication of the structure when a large pallet is to be changed, yet makes it possible to reduce an installation space of the whole machine or to prevent scattered chips from depositing on linear guide rails.

An invention of the present application is a pallet changer which is included in a machine tool having: a machining table being long in a predetermined direction and movable in the predetermined direction; and a pair of workpiece preparation parts being long in the predetermined direction and disposed so as to be parallel to the machining table and adjacent to both sides of the machining table, and which changes a machining-side pallet mounted on the machining table and a standby-side pallet mounted on the workpiece preparation part, the pallet changer including: a machining-side linear guide rail provided on the machining table and extending in a direction perpendicular to the predetermined direction; preparation-side linear guide rails provided on the workpiece preparation parts respectively, extending in the direction perpendicular to the predetermined direction, and coaxial with the machining-side linear guide rail; and linear guides provided on the respective pallets and slidably engageable with the machining-side and preparation-side linear guide rails, wherein, in changing the machining-side pallet on the machining table and the standby-side pallet on the workpiece preparation part, the machining-side pallet and the standby-side pallet are moved in the direction perpendicular to the predetermined direction.

According to the pallet changer according to the invention of the present application, the machining table and the workpiece preparation parts, both of which are long in the predetermined direction, are arranged in parallel, and when the machining-side pallet and the standby-side pallet are to be changed, they are moved in the direction perpendicular to the predetermined direction, which can reduce an installation space of the whole device compared with the conventional series arrangement.

Further, for the pallet change, the linear guides of the machining-side pallet and the standby-side pallet slide on the linear guide rails of the machining table and the workpiece preparation part, which can eliminate a need for the conventionally required pallet seatings, positioning pins, and so on, and accordingly makes it possible to avoid the complication of the structure when a large pallet in a long shape is to be changed.

In a preferable embodiment of the invention of the present application, the pallet changer further includes opening/closing shutters provided between the machining table and the workpiece preparation parts, wherein the preparation-side linear guide rails are each movable back and forth between a pallet change position abutting on or closely facing the machining-side linear guide rail and a standby position located on a machine exterior side of the shutter.

In the above preferable embodiment, the shutters are openably/closably disposed between the machining table and the workpiece preparation parts, and the preparation-side linear guide rails are each movable back and forth between the pallet change position abutting on or close to the machining-side linear guide rail and the standby position retreating to the machine exterior side of the shutter. Therefore, the preparation-side linear guide rails are retreating to the machine exterior side of the shutters during workpiece machining, which can surely prevent scattered chips from depositing on the preparation-side linear guide rails.

Another invention of the present application is a pallet changer which is included in a machine tool having: a machining table; and a pair of workpiece preparation parts disposed so as to be adjacent to the machining table, and which changes a machining-side pallet mounted on the machining table and a standby-side pallet mounted on the workpiece preparation part, the pallet changer including: a machining-side linear guide rail provided on the machining table; preparation-side linear guide rails provided on the workpiece preparation parts and coaxial with the machining-side linear guide rail; and linear guides provided on the respective pallets so as to be slidably engageable with the machining-side and preparation-side linear guide rails, wherein the preparation-side linear guide rails are each movable back and forth between a pallet change position abutting on or closely facing the machining-side linear guide rail and a standby position apart from the machining-side linear guide rail.

According to the other invention of the present application, the machining-side linear guide rail on the machining table and the preparation-side linear guide rails on the workpiece preparation parts are coaxially disposed, and the preparation-side linear guide rails are each movable back and forth between the position closely facing the machining-side linear guide rail and the position apart from the linear guide rail. Therefore, by making the preparation-side linear guide rails retreat during machining, it is possible to prevent scattered chips from depositing on facing portions of the preparation-side linear guide rails.

DETAILED DESCRIPTION OF THE PREFERRED EMBODIMENTS

Figure 1:
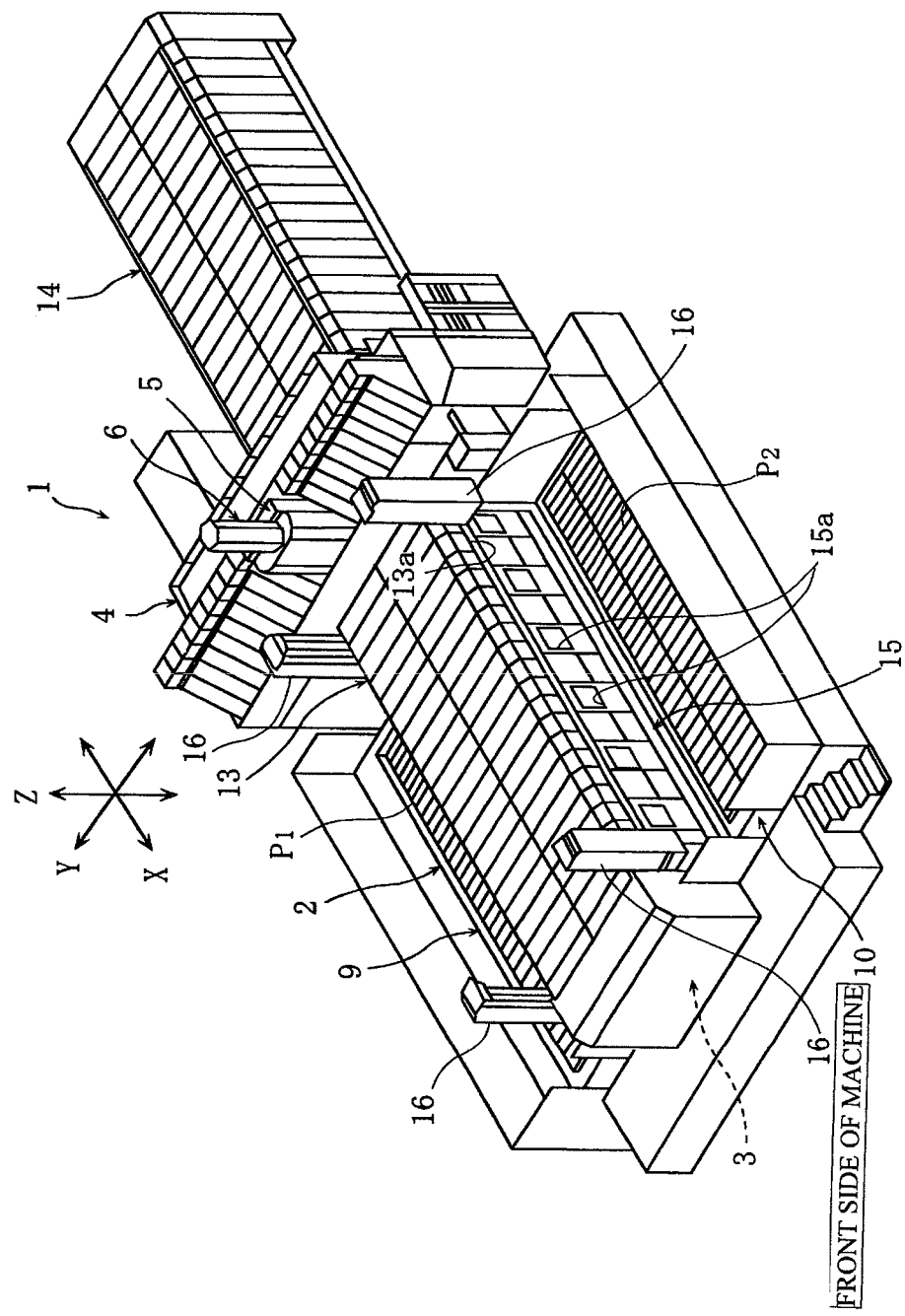
FIG. 1 is a whole perspective view of a machine tool including a pallet changer according to an embodiment 1 of the present invention.

An embodiment of the present invention will be hereinafter described based on the attached drawings.

FIG. 1 to FIG. 11 are views used to explain a pallet changer of a machine tool according to an embodiment 1 of the present invention. Note that, in this embodiment, front, rear, left, and right mean front, rear, left, and right in terms of a front view of the machine.

In the drawings, 1 denotes a machining center (machine tool) including a pallet changer 2. In the front view of the machine, the machining center 1 includes a fixed bed 3 extending in an X-axis direction (front and rear direction); a column 4 in a gate shape provided upright so as to cross a longitudinal middle portion of the fixed bed 3; a saddle 5 supported on the column 4 to be movable in a Y-axis direction (left and right direction); a spindle head 6 supported on the saddle 5 to be movable in a Z-axis direction (up and down direction); and a spindle 7 which is supported by the spindle head 6, with its axis directed in the X-axis direction and to which a rotating tool (not shown) is loaded attachably/detachably. Further, on the fixed bed 3, a machining table 8 which is long in the X-axis direction is mounted to be movable in the X-axis direction.

The machining table 8 has an X-axis direction length about ½ of that of the fixed bed 3, and on the machining table 8, a wide and long workpiece such as, for example, a body of a railway vehicle, a bus, or an airplane is mountable. The machining table 8 relatively moves in the X-axis direction between a front side and a rear side of the column 4 on the fixed bed 3 and the spindle 7 relatively moves in the Y-axis and Z-axis directions, so that predetermined workpiece machining is performed.

On the fixed bed 3, a front cover 13 and a rear cover 14, both in a box shape, covering a machining area of the fixed bed 3 are disposed on the front side and the rear side of the column 4 respectively.

In left and right side surfaces of the front cover 13, pallet change openings 13a are formed, and shutters 15, 15 opening/closing the openings 13a are disposed on the left and right pallet change openings 13a. The left and right shutters 15 are disposed so as to be located between the machining table 8 and later-described first and second workpiece preparation parts 9, 10. Hereinafter, the machining table side will be called a machine interior and the preparation side will be called a machine exterior.

The left and right shutters 15 are each supported by a pair of front and rear support posts 16, 16 so as to be movable up and down, and are openably/closably driven by not-shown motors via chains. The shutters 15 each have a plurality of see-through windows 15a through which the machine interior can be seen.

The pallet changer 2 includes the first and second workpiece preparation parts 9, 10 having substantially the same X-axis direction length as that of the machining table 8 and disposed on left and right sides of the fixed bed 3 respectively so as to be parallel and adjacent to the machining table 8, and is structured to automatically change a machining-side pallet P1 mounted on the machining table 8 and a standby-side pallet P2 mounted on one of the first and second workpiece preparation parts 9, 10.

Figure 2:
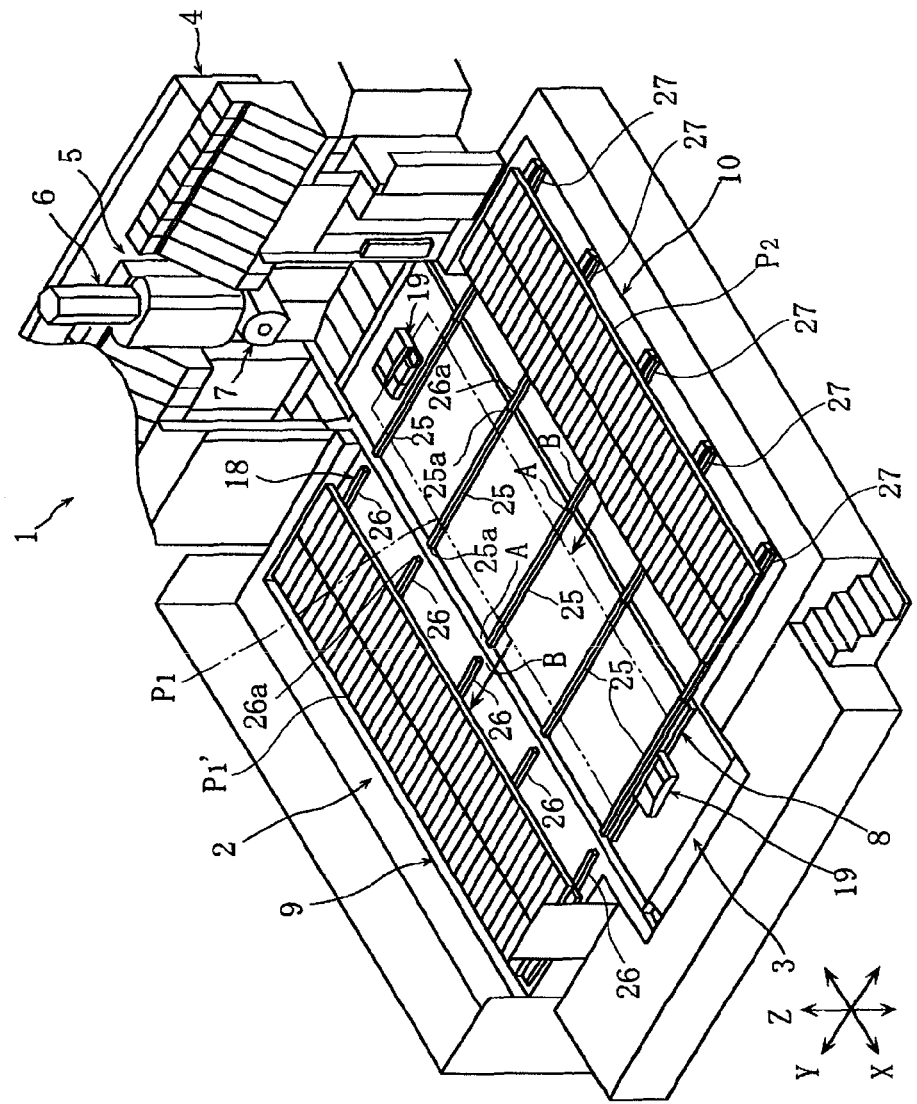
FIG. 2 is a perspective view of a pallet changer part of the machine tool.
Figure 3:
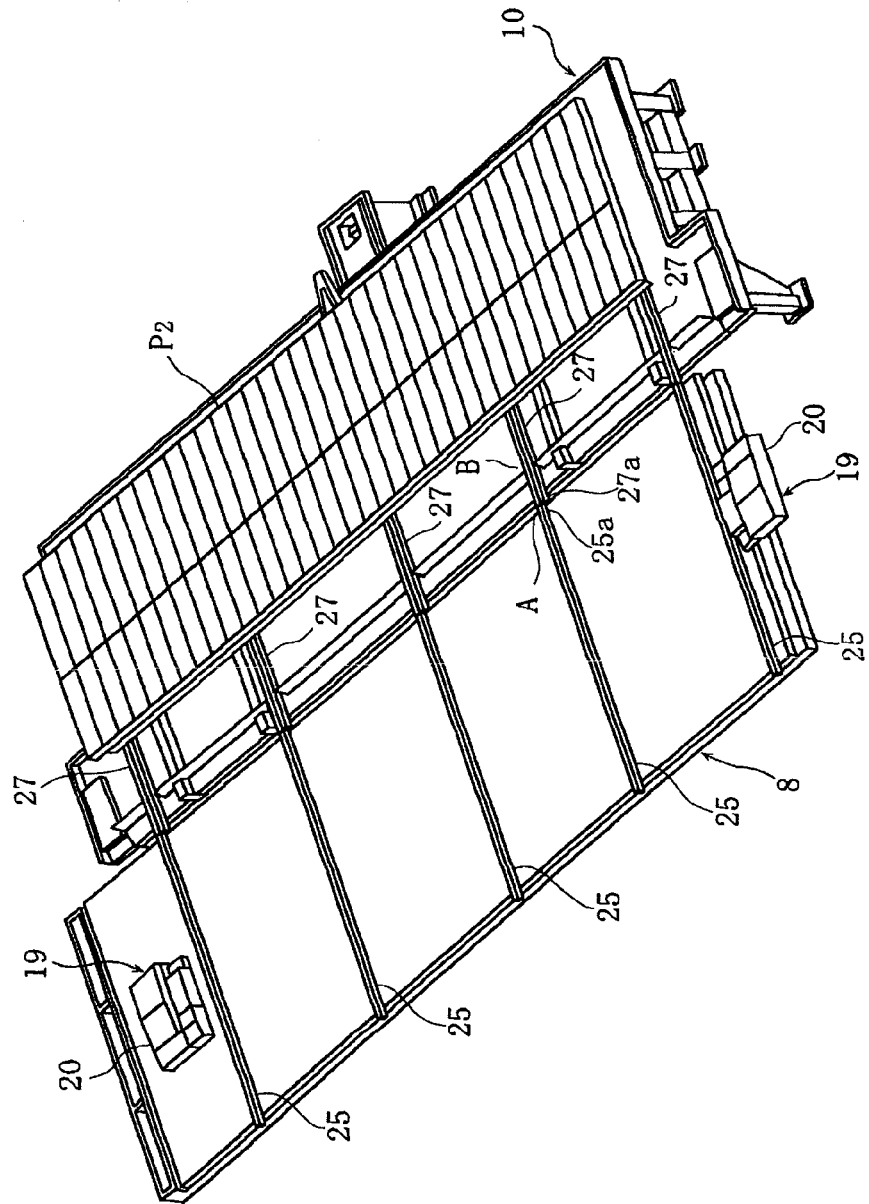
FIG. 3 is a perspective view of the pallet changer.
Figure 4:
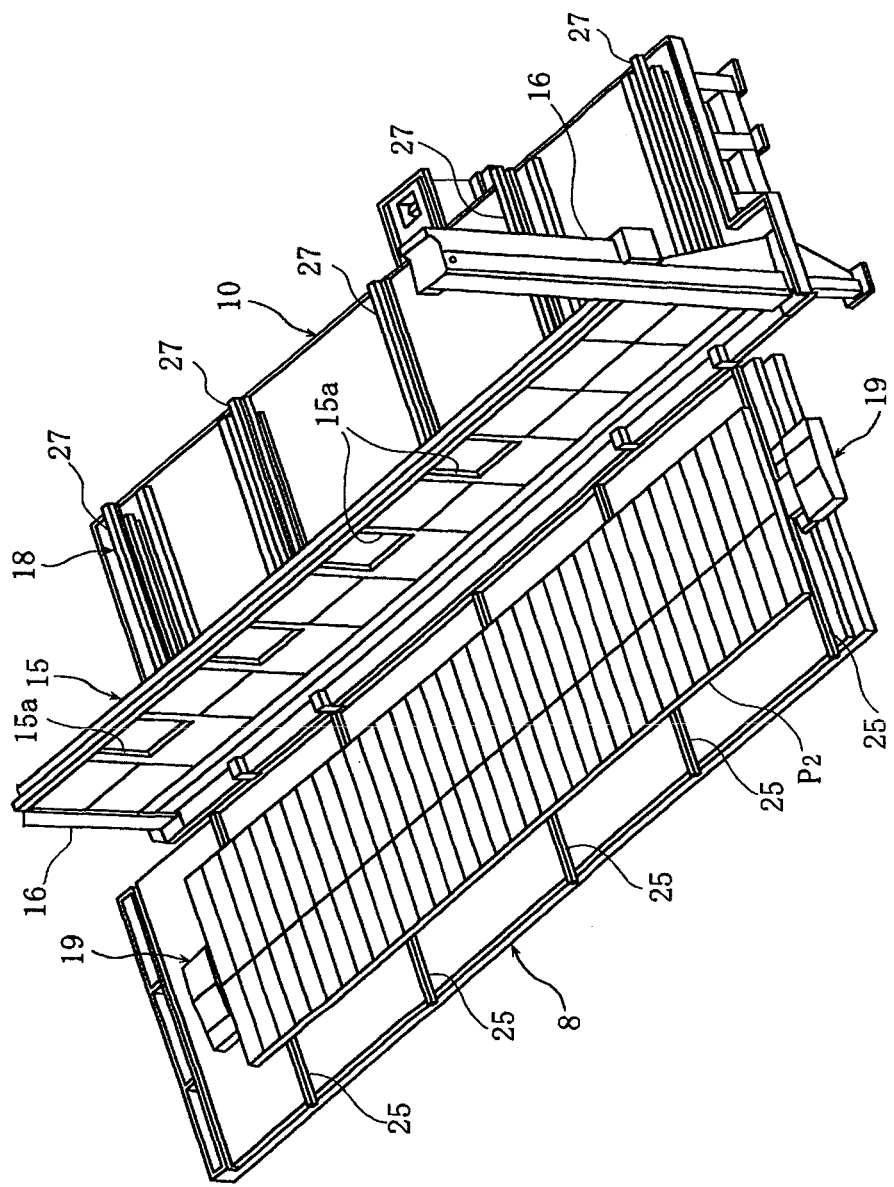
FIG. 4 is a perspective view of the pallet changer.

In more detail, for example, as shown in FIG. 2, when machining is finished, the machining-side pallet P1 which is on the machining table 8 and on which a machined workpiece is set is carried out onto the first workpiece preparation part 9, and the machined workpiece is carried out from a standby-side pallet P1' on the first workpiece preparation part 9. During the machining, a workpiece to be machined next is set on the standby-side pallet P2 on the second workpiece preparation part 10, and when the unloading of the machining-side pallet P1 to the first workpiece preparation part 9 is finished, the standby-side pallet P2 on the second workpiece preparation part 10 is carried onto the machining table 8, and the workpiece to be machined next that is set is subjected to predetermined machining. When the machining is finished, the machining-side pallet P1 on which the machined workpiece is set is carried out to the second workpiece preparation part 10 this time. The pallet change is performed by such alternate loading and unloading of the pallets on the first and second workpiece preparation parts 9, 10 and the pallet on the machining table 8.

The pallet changer 2 includes: a linear guide mechanism 18 by which the machining-side pallet P1 and the stand-by side pallet P2 are supported to be movable in the Y-axis direction; and a pair of clamping mechanisms 19, 19 positioning and fixing the pallets P1, P2 on the machining table 8.

Figure 10:
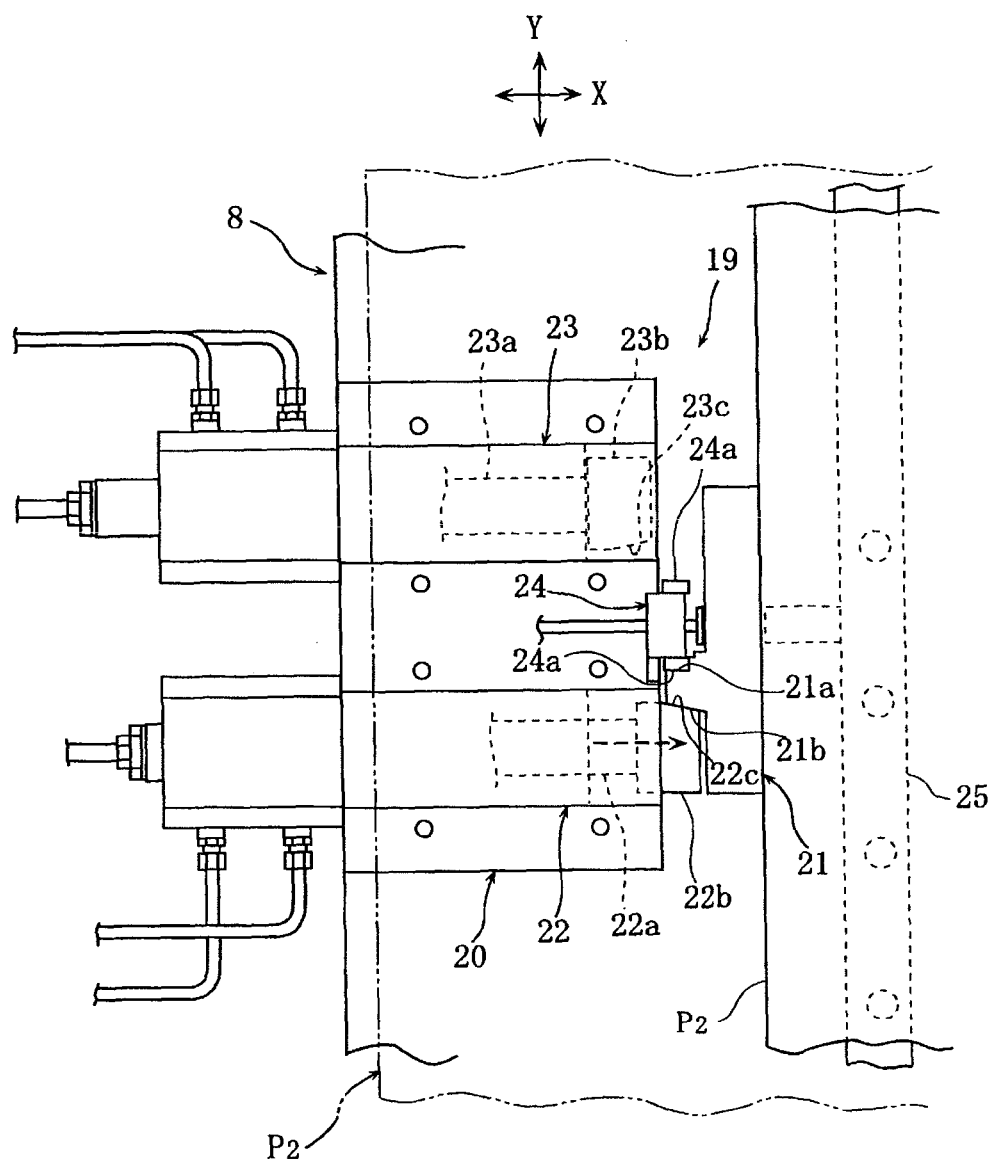
FIG. 10 is a plane view of a clamping mechanism of the pallet changer.
Figure 11:
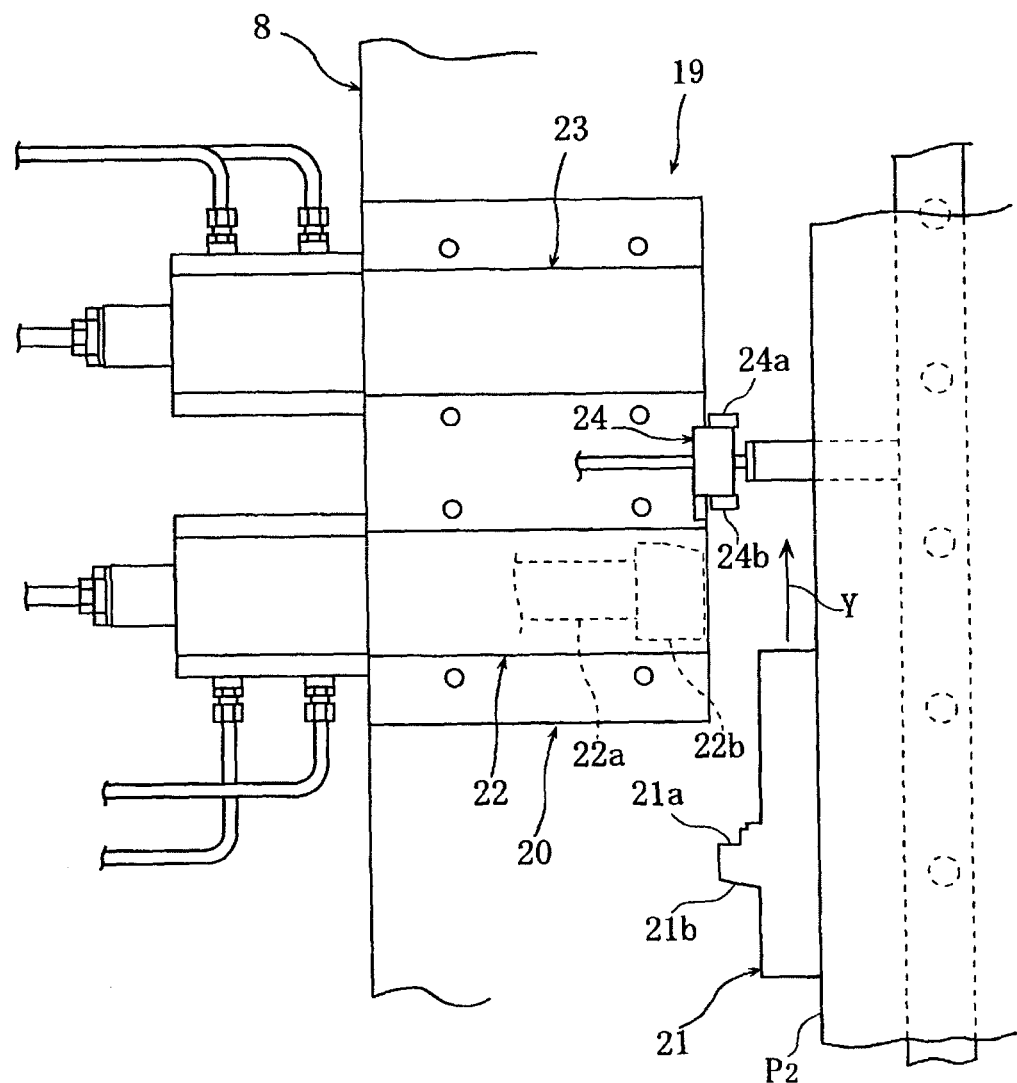
FIG. 11 is a plane view of the clamping mechanism.

The clamping mechanisms 19 include: clamping parts 20 fixed to X-axis direction both ends of the machining table 8; and clamping blocks 21 fixed to bottom surfaces of the pallets P1, P2, as shown in FIG. 10 and FIG. 11.

The clamping parts 20 each have: first and second hydraulic cylinders 23, 22 extending in the X-axis direction and disposed in parallel to each other; and a stopper block 24 disposed between the both cylinders. Clampers 23b, 22b having wedge surfaces 23c, 22c are fixed to front ends of piston rods 23a, 22a of the first and second hydraulic cylinders 23, 22. Further, on each of the clamping blocks 21, an abutting portion 21a abutting on an abutted surface 24a of the stopper block 24 and a wedge surface 21b to which the wedge surface 22c of the clamper 22b is fit are formed.

For example, when the standby-side pallet P2 on the second workpiece preparation part 10 is loaded onto the machining table 8, the abutting portions 21a of the clamping blocks 21 of the standby-side pallet P2 abut on the abutted surfaces 24a of the stopper blocks 24. In this state, the piston rods 22a of the second hydraulic cylinders 22 advance and the wedge surfaces 22c of the dampers 22b are fit to and press the wedge surfaces 21b of the clamping blocks 21, so that the stopper blocks 24 and the dampers 22b sandwich the pallet P2 to restrict the Y-axis direction movement of the pallet P2. When the piston rods 22a move back, the clamping is released. Incidentally, when the standby-side pallet P2 of the first workpiece preparation part 9 is loaded, the first hydraulic cylinders 23 clamp the clamping blocks (not shown) of the pallet P2.

The linear guide mechanism 18 has: five machining-side linear guide rails 25 disposed on the machining table 8; five first preparation-side linear guide rails 26 disposed on the first workpiece preparation part 9 and five second preparation-side linear guide rails 27 disposed on the second workpiece preparation part 10; and first and second linear guides 28 disposed on the respective pallets P1, P2 and slidably engaged with the machining-side and preparation-side linear guide rails 25, 26, 27, and in more detail, has the following structure.

The machining-side linear guide rails 25 extend in the Y-axis direction perpendicular to the X-axis direction, are arranged at predetermined intervals in the X-axis direction, and are fixed by bolting to the machining table 8.

The first and second preparation-side linear guide rails 26, 27 extend in the Y-axis direction perpendicular to the X-axis direction and are arranged at predetermined intervals in the X-axis direction. The first and second preparation-side linear guide rails 26, 27 are disposed so as to be coaxial with the machining-side linear guide rails 25 when the machining table 8 is positioned at the pallet change positions.

The linear guides 28 are fixed by bolting to the bottom surfaces of the pallets P1, P2 respectively and are slidably engageable with the machining-side and preparation-side linear guide rails 25 to 27 via many balls (not shown).

Figure 5:
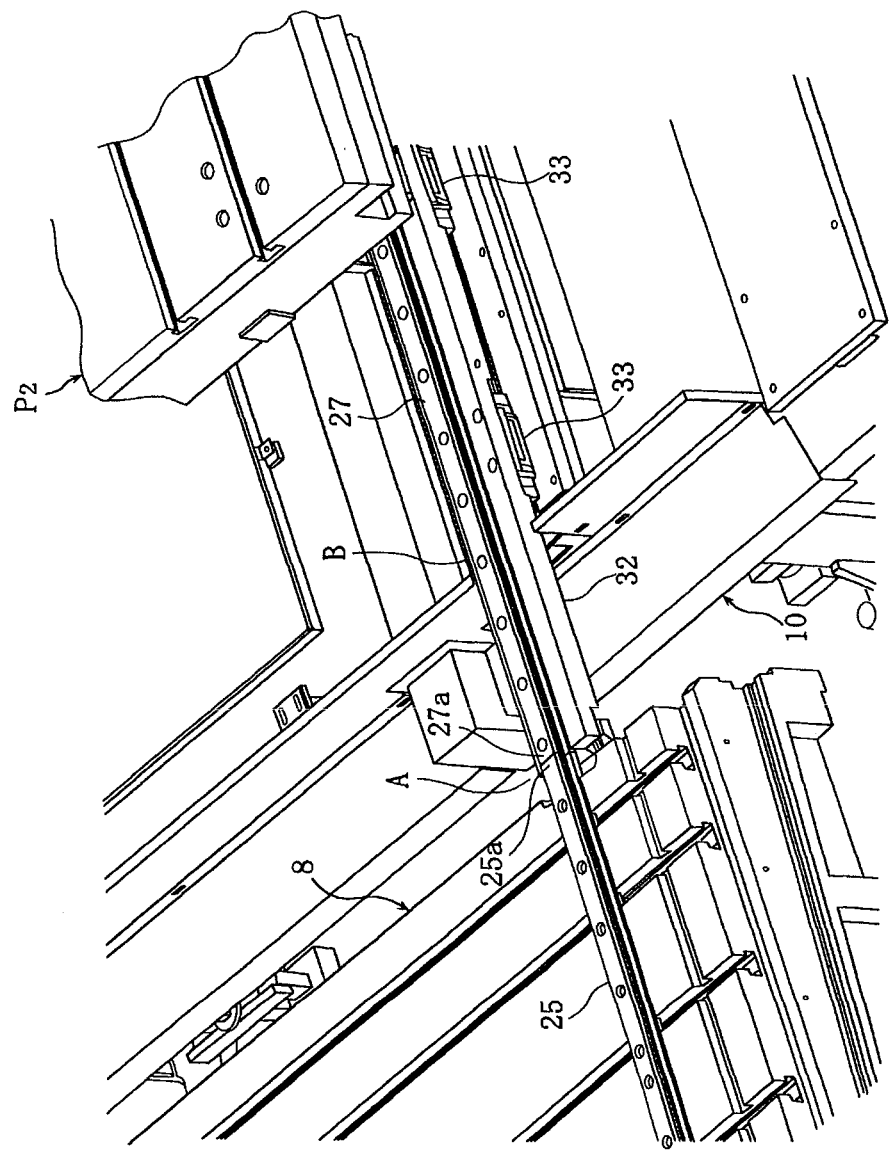
FIG. 5 is a perspective view of a linear guide mechanism of the pallet changer.
Figure 6:
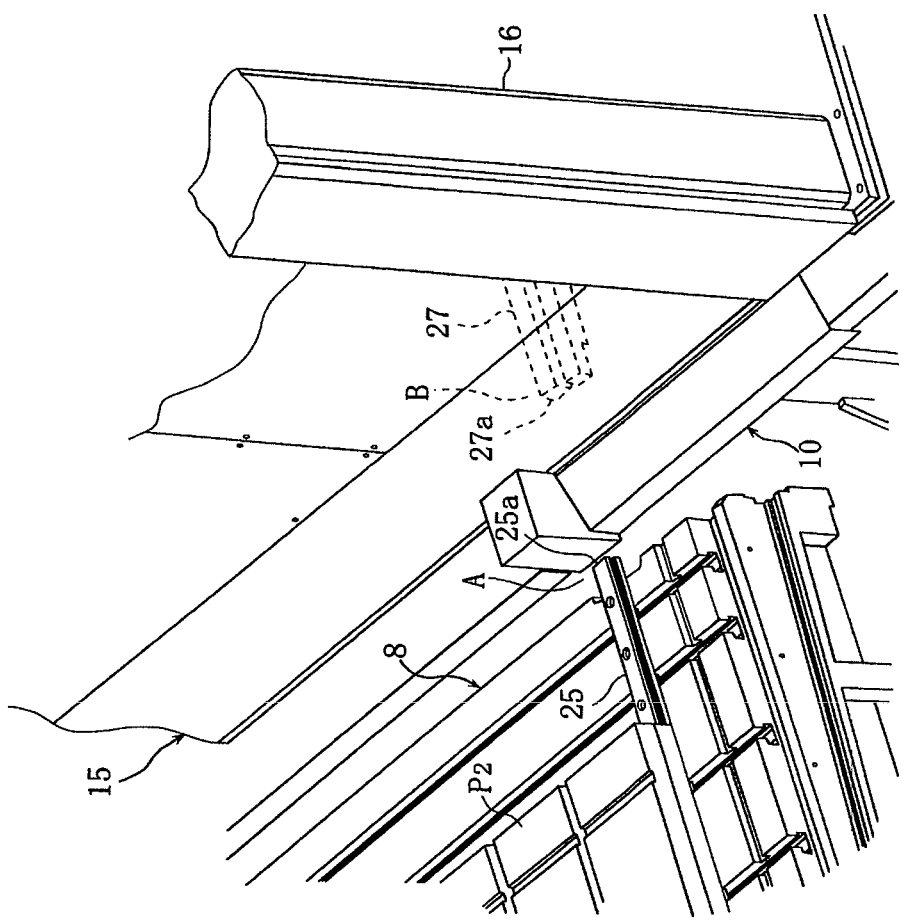
FIG. 6 is a perspective view of the linear guide mechanism.
Figure 7:
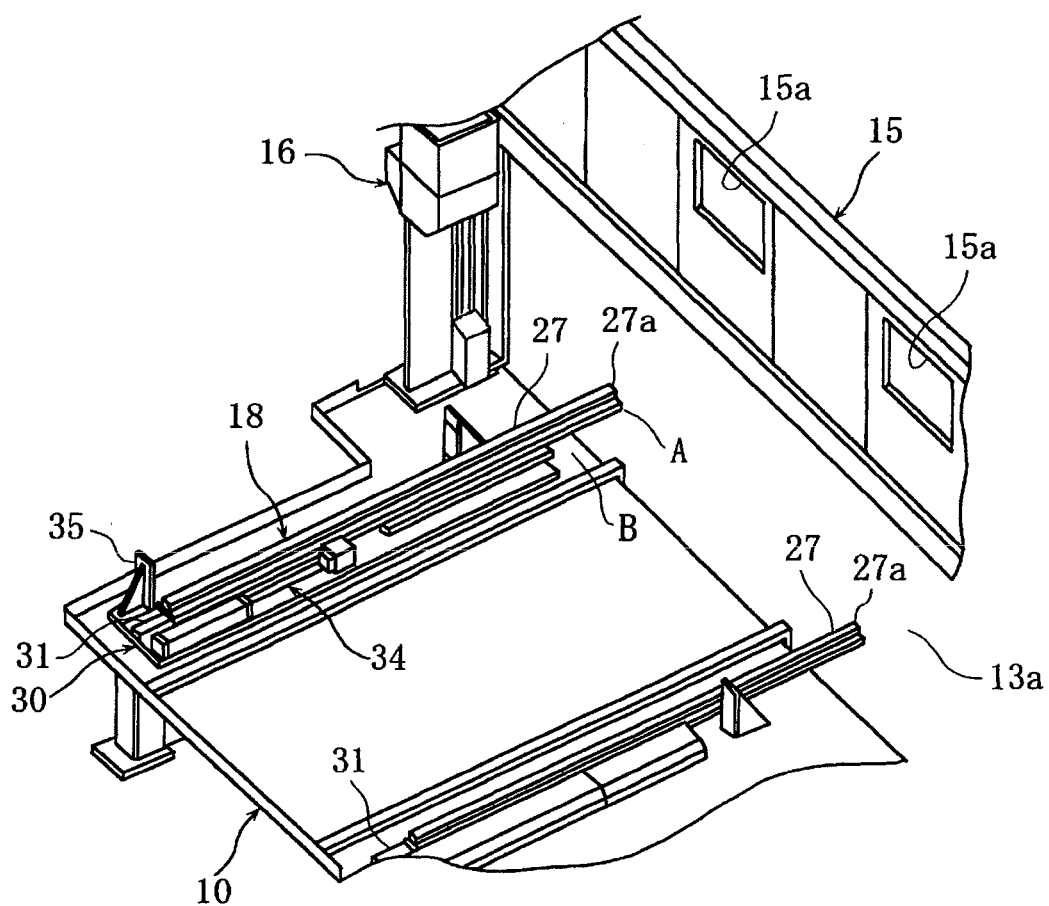
FIG. 7 is a perspective view of the linear guide mechanism.
Figure 8:
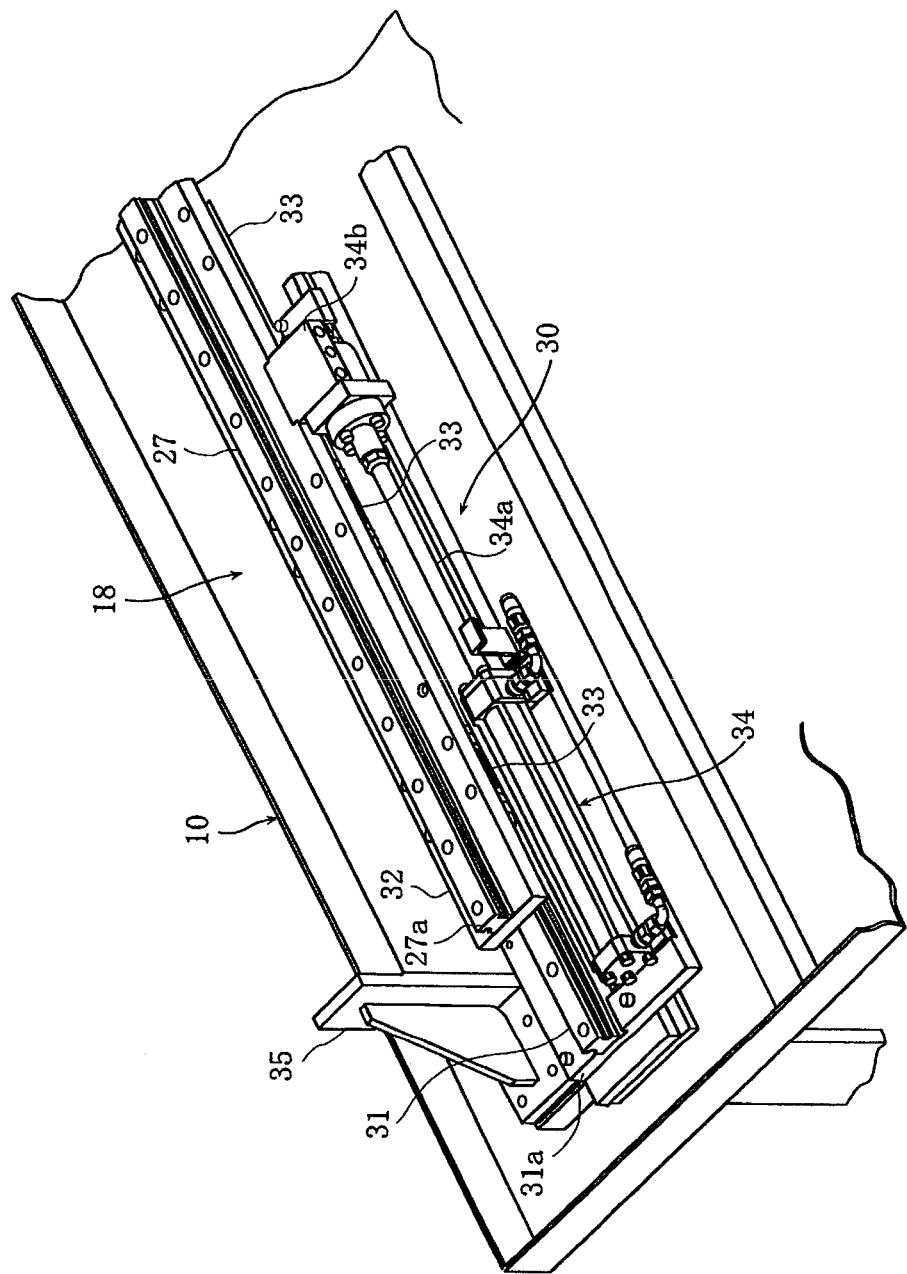
FIG. 8 is a perspective view of a driving part of the linear guide mechanism.
Figure 9:
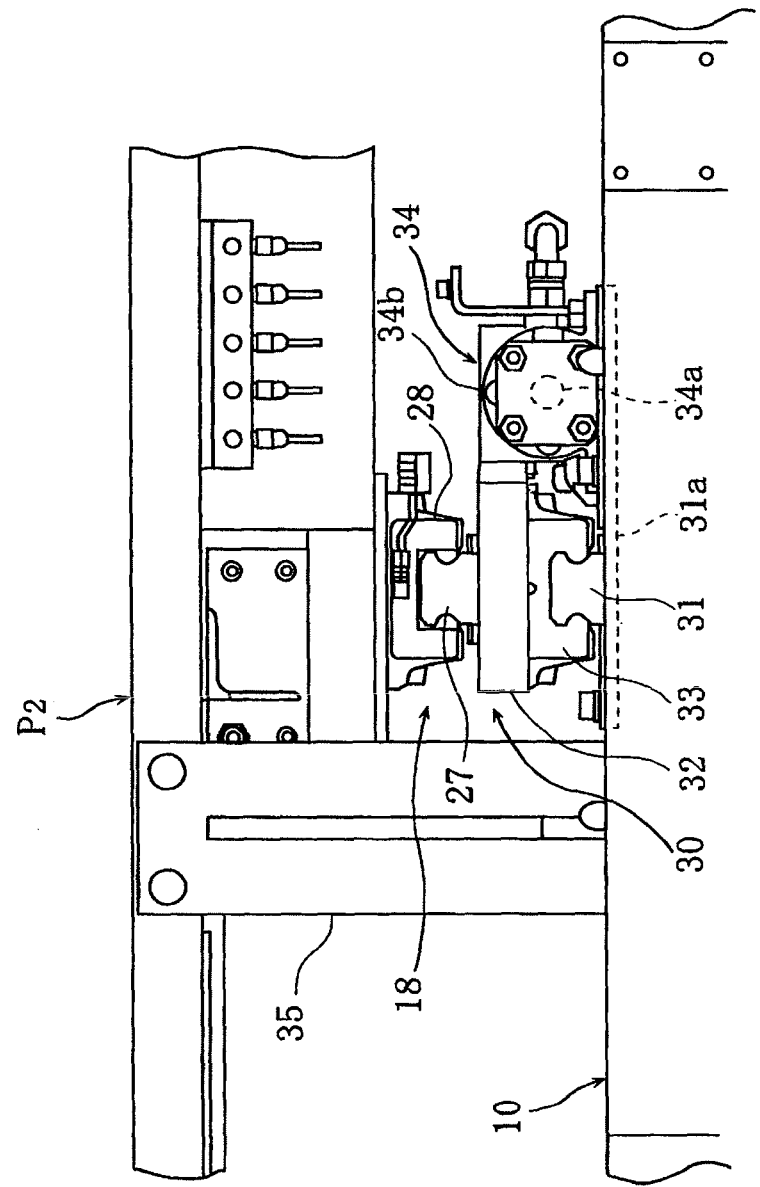
FIG. 9 is a rear view of the driving part.

The first and second preparation-side linear guide rails 26, 27 are movable back and forth between the pallet change positions A, at which their axial-direction end surfaces 26a, 27a on a machine exterior side abut on machine exterior side end surfaces 25a, 25a of the machining-side linear guide rails 25 or are close to the machine exterior side end surfaces 25a, 25a with a small gap (about 0.5 mm) therebetween, and standby positions B which are apart from the machining-side linear guide rails 25 and are retreating to the machine exterior sides of the shutters 15 (see FIG. 5 and FIG. 6).

The first and second preparation-side linear guide rails 26, 27 are driven by independent drive mechanisms 30 respectively to move back and forth between the pallet change positions A and the standby positions B. The drive mechanisms 30 have the same structure, and therefore, only the drive mechanism 30 disposed on the second preparation-side linear guide rail 27 shown in FIG. 7 to FIG. 9 will be described in detail.

The drive mechanism 30 includes: a linear guide rail 31 for rail guide fixed by bolting to the second workpiece preparation part 10 via a base plate 31a; a plurality of linear guides 33 for rail guide disposed at predetermined intervals on a bottom surface of a base plate 32 to which the second preparation-side linear guide rail 27 is fixed, and slidably engaged with the linear guide rail 31; and a hydraulic cylinder 34 by which the second preparation-side linear guide rail 27 is driven to move back and forth.

The second preparation-side linear guide rail 27 is fixed by bolting to an upper surface of the base plate 32 equal in length to the second preparation-side linear guide rail 27, and the linear guides 33 are fixed by bolting to a lower surface of the base plate 32.

The hydraulic cylinder 34 is disposed so as to be parallel and adjacent to the linear guide rail 31 and is connected to the base plate 32 via its piston rod 34a and coupling member 34b. Here, an alternative possible structure is to collectively drive the five second preparation-side linear guide rails 27 so that they move back and forth. Note that 35 denotes a stopper restricting the standby position B of the pallet P2.

According to this embodiment, the machining table 8 and the first and second workpiece preparation parts 9, 10, all of which are long in the X-axis direction, are disposed in parallel and adjacently, and to change the machining-side pallet P1 and the standby-side pallet P2, they are moved in the Y-axis direction perpendicular to the X-axis direction, which can reduce the installation space of the whole machine compared with the conventional structure where the machining table and the preparation parts are arranged in series.

In this embodiment, the machining-side linear guide rails 25 extending in the Y-axis direction perpendicular to the X-axis direction are disposed on the machining table 8, the first and second preparation-side linear guide rails 26, 27 are disposed on the first and second workpiece preparation parts 9, 10 so as to be coaxial with the machining-side linear guide rails 25, and for the pallet change, the linear guides 28 are slid on the linear guide rails 25 to 27. Therefore, the conventionally needed pallet seatings, positioning pins, air blow, and pallet lift-up hydraulic cylinders are not necessary, which can simplify the structure when a long and large pallet is to be changed.

Further, in this embodiment, only by moving the first and second preparation-side linear guide rails 26, 27 to their advance ends while the machining table 8 is positioned at the pallet change positions A, it is possible to coaxially position the first and second linear guide rails 26, 27 and the machining-side linear guide rails 25 easily, surely, and accurately.

In this embodiment, the shutters 15 are openably/closably disposed between the machining table 8 and the first and second workpiece preparation parts 9, 10, and the first and second preparation-side linear guide rails 26, 27 are movable back and forth between the pallet change positions A, which abut on or are close to the machining-side linear guide rails 25, and the standby positions B apart from the machining-side linear guide rails 25. Therefore, the preparation-side linear guide rails 26, 27 are retreating to the machine exterior sides of the shutters 15 during workpiece machining, and thus scattered chips do not deposit on the preparation-side linear guide rails 26, 27, which can prevent a damage that is caused if the linear guides 28 ride on the deposit.

In the embodiment 1, a description is given of the case where the first and second preparation-side linear guide rails 26, 27 are movable back and forth in the axial direction in the case where the long first and second preparation parts 9, 10 are arranged in parallel on the left and right sides of the long machining table 8, but it should be noted that an applicable range of this reciprocation structure of the linear guide rails is not limited to the embodiment 1. This structure is also applicable to, for example, the aforesaid case where the machining table and the preparation parts are arranged in series, and the same effects as those of the embodiment are also obtained in this case.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

The text of Japanese priority application no. 2010-198574 filed on Sep. 6, 2010 is hereby incorporated by reference.

What is claimed is:

1. A pallet changer of a machine tool, which pallet changer is included in a machine tool having:

a machining table having a longitudinal axis that extends in a predetermined direction, the machining table being movable in the predetermined direction;

and a pair of workpiece preparation parts each having a longitudinal axis extending in the predetermined direction and disposed so as to be parallel to the longitudinal axis of the machining table, and one of the workpiece preparation parts being located adjacent to one side of the machining table, and the other workpiece preparation part being located adjacent to an opposite side of the machining table, and which pallet changer changes a machining-side pallet mounted on the machining table and a standby-side pallet mounted on one of the workpiece preparation parts, the pallet changer comprising:

a machining-side linear guide rail provided on the machining table and having a longitudinal axis extending in a direction perpendicular to the predetermined direction;

preparation-side linear guide rails provided on the workpiece preparation parts respectively, each preparation-side linear guide rail having a longitudinal axis extending in the direction perpendicular to the predetermined direction, and coaxial with the longitudinal axis of the machining-side linear guide rail; and linear guides provided on the respective pallets and slidably engageable with the machining-side and preparation-side linear guide rails, wherein, in changing the machining-side pallet on the machining table and the standby-side pallet on one of the workpiece preparation parts, the machining-side pallet and the standby-side pallet are moved in the direction perpendicular to the predetermined direction, and wherein the preparation-side linear guide rails are each provided so as to be linearly movable back and forth between a pallet change position abutting on or close to the machining-side linear guide rail and a standby position located distant from the machining-side linear guide rail.

2. The pallet changer of the machine tool according to claim 1, further comprising:

openable and closeable shutters provided between the machining table and the workpiece preparation parts, wherein the standby position is located on a machine exterior side of the shutter.

* * * * *